(12) United States Patent
Whitehouse

(10) Patent No.: US 9,707,939 B2
(45) Date of Patent: Jul. 18, 2017

(54) MITTER WRINGER

(71) Applicant: Todd Whitehouse, Tolland, CT (US)

(72) Inventor: Todd Whitehouse, Tolland, CT (US)

(73) Assignee: Connecticut Carwash, LLC, Glastonbury, CT (US)

( * ) Notice: Subject to any disclaimer, the term of this patent is extended or adjusted under 35 U.S.C. 154(b) by 936 days.

(21) Appl. No.: 13/894,011

(22) Filed: May 14, 2013

(65) Prior Publication Data

US 2014/0338697 A1 Nov. 20, 2014

(51) Int. Cl.
| | |
|---|---|
| A47L 13/08 | (2006.01) |
| A47L 13/50 | (2006.01) |
| B25B 9/00 | (2006.01) |
| B60S 3/06 | (2006.01) |
| A46B 17/06 | (2006.01) |
| A46B 13/00 | (2006.01) |

(52) U.S. Cl.
CPC .............. *B60S 3/063* (2013.01); *A46B 17/06* (2013.01); *A47L 13/08* (2013.01); *A47L 13/50* (2013.01); *B25B 9/00* (2013.01); *A46B 13/001* (2013.01); *A46B 2200/3046* (2013.01)

(58) Field of Classification Search
CPC .......... A47L 13/02; A47L 13/08; A47L 13/59; A47G 21/10; B25B 9/02; B65D 35/24
See application file for complete search history.

(56) References Cited

U.S. PATENT DOCUMENTS

| | | | | |
|---|---|---|---|---|
| 81,272 | A * | 8/1868 | Gullman | A47L 13/59 15/261 |
| 520,818 | A * | 6/1894 | Bettinger | H02G 1/1214 15/236.06 |
| 754,870 | A * | 3/1904 | Hill | A47L 13/58 15/261 |
| 2,223,147 | A * | 11/1940 | Cave | A47L 13/59 15/119.1 |
| 2,682,354 | A * | 6/1954 | Women | B65D 35/24 222/95 |
| 2,888,700 | A * | 6/1959 | McClanahan | A01D 46/08 15/105 |
| D194,049 | S * | 11/1962 | Harano | D28/55 |
| 3,267,970 | A | 8/1966 | Maguire, Jr. et al. | |

(Continued)

FOREIGN PATENT DOCUMENTS

| | | |
|---|---|---|
| JP | H10138881 A | 5/1998 |
| JP | 3080610 U | 10/2001 |
| TW | M247467 U | 10/2004 |

*Primary Examiner* — Randall Chin
(74) *Attorney, Agent, or Firm* — McCormick, Paulding & Huber LLP

(57) ABSTRACT

A handheld mitter wringer tool is provided for cleansing build-up from hanging mitters. For example, one can expel build-up from a mitter, which is secured at one end to a fixed structure, by indenting the mitter between two non-cutting surfaces that extend across the width of the mitter, while moving the two surfaces along the mitter away from the secured end. Thus, a mitter wringer tool may have a pair of elongate plates that are operatively connected for movement from a fully-opened position, in which working faces of the plates are displaced apart for receiving a mitter, to a working position, in which the working faces are closely opposed and generally parallel for slidably gripping and wringing the mitter.

3 Claims, 4 Drawing Sheets

(56) References Cited

U.S. PATENT DOCUMENTS

| | | | | |
|---|---|---|---|---|
| 3,430,286 A * | 3/1969 | Bownes | ................... | B44D 3/24 100/155 R |
| 3,486,183 A * | 12/1969 | Caprioli | ................. | B23D 79/06 15/104.04 |
| 3,516,159 A * | 6/1970 | Bercier | .............. | H05K 13/0007 30/169 |
| 3,745,622 A * | 7/1973 | DeAmicis | .............. | B23D 71/00 15/104.011 |
| 4,133,069 A * | 1/1979 | Sunshine | ................. | B25B 7/04 15/104.011 |
| 4,521,934 A * | 6/1985 | Castle | .................... | A47L 13/08 15/236.09 |
| 4,704,763 A | 11/1987 | Sacks et al. | | |
| 4,793,061 A * | 12/1988 | Rizzo, Jr. | ................. | A63F 3/068 15/236.01 |
| 5,017,239 A | 5/1991 | Morrison | | |
| 5,272,782 A * | 12/1993 | Hutt | ........................ | A47L 25/00 15/105 |
| 5,561,904 A * | 10/1996 | Chung | .................... | A01G 5/00 30/234 |
| 6,594,852 B1 * | 7/2003 | Schedlinski | ........ | A47J 37/0786 15/104.04 |
| D518,687 S * | 4/2006 | Baker | ......................... | D24/143 |
| 7,287,791 B2 * | 10/2007 | Carolina | ................ | A47G 21/10 294/16 |
| 7,607,193 B1 * | 10/2009 | Franklin | ................. | A63F 3/068 15/236.01 |
| 7,614,182 B2 * | 11/2009 | Oderwald | ................ | A01G 1/06 47/58.1 CF |
| D671,579 S * | 11/2012 | Lein | .............................. | D15/144 |
| 8,938,843 B2 * | 1/2015 | Junkins | .................. | B08B 11/00 15/236.03 |
| 2007/0084010 A1 * | 4/2007 | Evans | ..................... | A47L 13/60 15/262 |

\* cited by examiner

MITTER WRINGER

BACKGROUND

Technical Field

The invention relates to automatic car washes. More particularly, embodiments of the invention relate to operation and maintenance of mitters within automatic car washes.

Discussion of Art

Mechanized or automatic car washes are well known for cleaning the exteriors of automotive vehicles. Typically, an automatic car wash consists of a tunnel housing a variety of water jet stations and moving brush stations, through which a vehicle is pulled on a conveyor.

For example, as shown at FIG. 1, a vehicle 10 may enter a car wash through a mitter station 12. The mitter station includes a motorized rack 14, which drives numerous mitters 16 in oscillating motion lateral to the path of the vehicle. The mitters are long vertical swaths of fabric that rub against an exterior of the vehicle, subsequent or concurrent with application of sprays or jets of water and/or chemicals, thereby removing grime from the vehicle exterior along with most of the water and/or chemicals. In order to accomplish their purpose of grime removal and toweling-off, formerly accomplished by manual laborers using terry cloth mitts (thus the term "mitters"), the mitters 16 are fabricated from porous and absorbent non-woven material. For example, a polyester/polyethylene nonwoven fabric is commonly used.

After passing the mitters 16, the vehicle 10 moves through a wraparound station 18 (shown in FIG. 2), where a set of rotating brushes 20 move around the vehicle on another motorized rack 22. The rotating brushes are driven by vertical-axis motors 24, which in turn move along rails of the rack. The rotating brushes typically comprise numerous long, thin strips of polymer (e.g., closed-cell foam) or other non-absorbent material. Typically, the rotating brushes are applied to the vehicle exterior in conjunction with additional sprays or jets of water and/or chemicals. One purpose of the wraparound station is to remove dust that may have adhered through the mitter station 12. Another purpose is to apply surface treatments such as wax, conditioner, coat sealer, polish, etc. The non-absorbent and smooth surface of the rotating brush strips enhances surface finish.

After the wraparound station 18, the vehicle 10 typically passes through an exit mitter station (not shown) that includes additional mitters. Here, the purpose of the mitters is to remove excess surface treatments and water. Again, the absorbent structure of the mitters aids in this purpose.

Thus, by the end of day down at the car wash, the mitters have become sodden with mud (at the entrance station) or with wax and conditioner (at the exit station). If the mud and wax (collectively, "build-up") are not removed, then the mitters soon will begin to leave streaks on the vehicle exteriors, a problem resented by most people willing to pay for a car wash.

Accordingly, it is desirable to cleanse the mitters of their accumulated mud and wax deposits. One approach for cleansing mitters, often recommended by car wash equipment manufacturers, is to remove the mitters from their hanging racks and either wash them in an industrial laundry, or spray them down with a power washer (high pressure, high temperature water spray). However, it is not easy as a first step to remove the mitters from their racks. The porous nature of the mitters means that capillary action tends to draw liquid and grime throughout the mitters, and even into an upper edge of each mitter. At the upper edge a groove or C-channel formed on the hanging rack engages and supports each mitter. Liquid accumulated at this upper edge is difficult to extract (being somewhat trapped by the groove or C-channel) and makes the upper edge swell so that it requires brute strength to remove the mitter from the rack. Additionally, the process of laundering the mitters as a second step can take several hours, which means an additional shift of work after hours. Worse yet, industrial laundries are not reliably effective at removing build-up from mitters. On the other hand, power washing the mitters as a second step is not optimally effective due to the mitters flapping and twisting under impact of the power spray.

Therefore, a solution is desired for effectively cleansing mitters in place, without requiring removal of the mitters from their hanging racks; and, preferably, making use of the hanging racks to enhance efficiency of cleansing.

BRIEF DESCRIPTION

According to the present invention, a handheld mitter wringer tool is provided for cleansing build-up from hanging mitters. For example, one can expel build-up from a mitter, which is secured at one end to a fixed structure, by indenting the mitter between two non-cutting surfaces that extend across the width of the mitter, while moving the two surfaces along the mitter away from the secured end.

According to embodiments of the invention, a handheld mitter wringer tool includes a pair of elongate plates. Each plate has a working face that extends from a first end to a second end between working edges. The plates are operatively connected for movement from a fully-opened position, in which the working faces are displaced apart for receiving a mitter therebetween, to a working position, in which the working faces are closely opposed and generally parallel for slidably gripping and wringing the mitter therebetween.

According to other embodiments of the invention, a handheld mitter wringer tool includes an elongate plate that has a working face extending from a first end to a second end between working edges, and a rail, which is operatively connected with the elongate plate for movement from a fully-opened position, in which the rail is displaced apart from the plate for receiving a mitter, to a working position, in which the rail closely opposes and extends along the working surface of the plate, proximate a working edge, for slidably gripping and wringing the mitter therebetween.

According to yet other embodiments of the invention, a handheld mitter wringer tool includes a pair of rails operatively connected for movement from a fully-opened position, in which the rails are displaced apart for receiving a mitter therebetween, to a working position, in which the rails are closely opposed and generally parallel for slidably gripping and wringing the mitter therebetween; and a pair of handles, each attached at an end of a respective rail, for moving the pair of rails between the fully-opened position or the working position and for moving the pair of rails in the working position along the mitter.

These and other objects, features and advantages of the present invention will become apparent in light of the detailed description thereof, as illustrated in the accompanying drawings.

DRAWINGS

Figure 1:
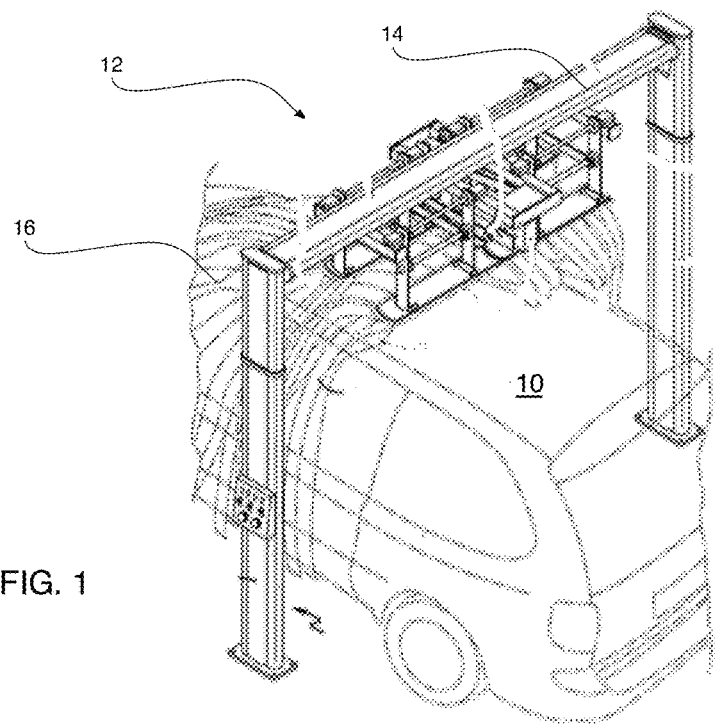
FIG. 1 shows a mitter station of an automatic car wash.
Figure 2:
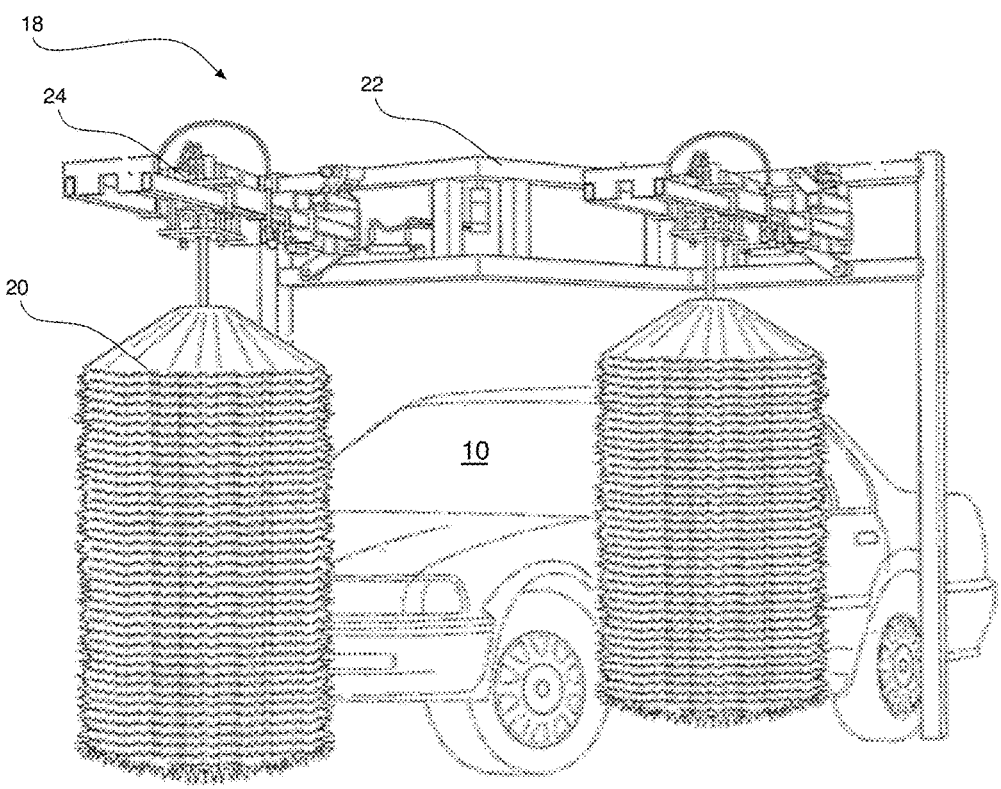
FIG. 2 shows a wraparound station of an automatic car wash.
Figure 3A:
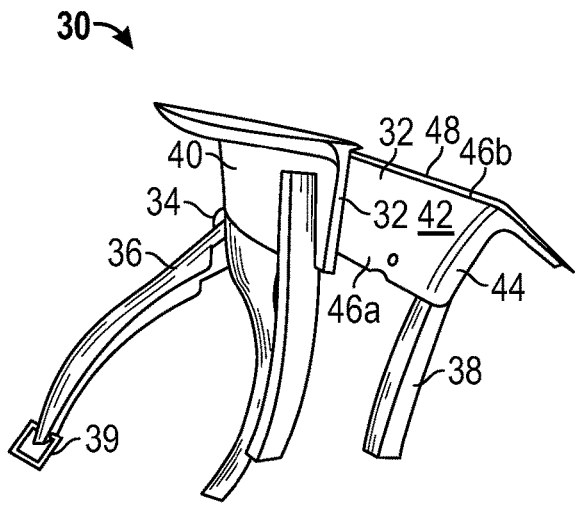
Figure 3B:
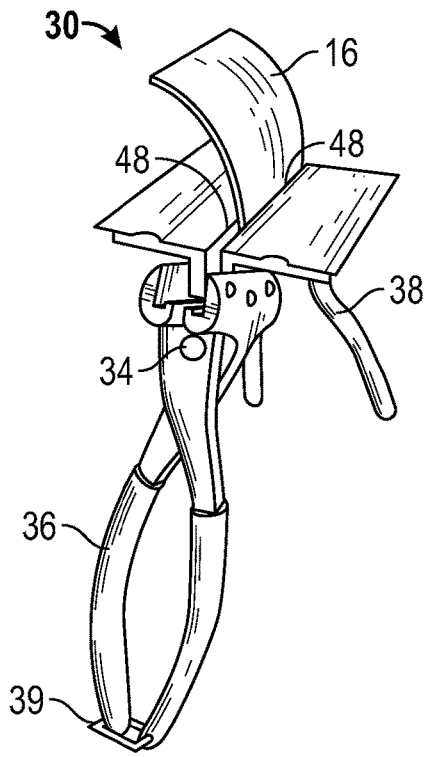

FIG. 3, comprising views 3A and 3B, shows a mitter wringer, according to a first embodiment of the invention, in an open position (FIG. 3A) and in a closed or working position (FIG. 3B).

Figure 4:
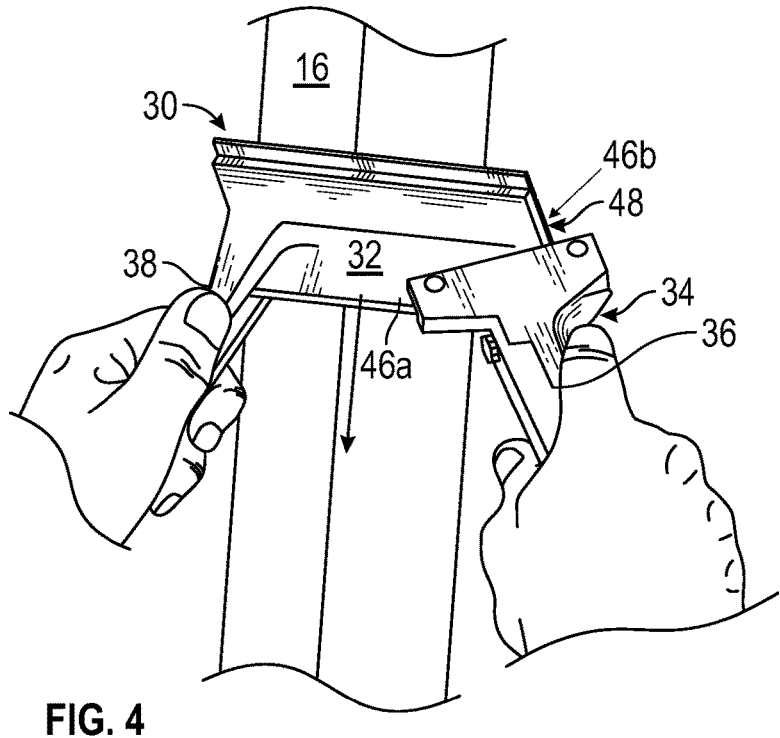

FIG. 4 shows use of the first embodiment of the invention, according to an aspect of the invention.

Figure 5B:
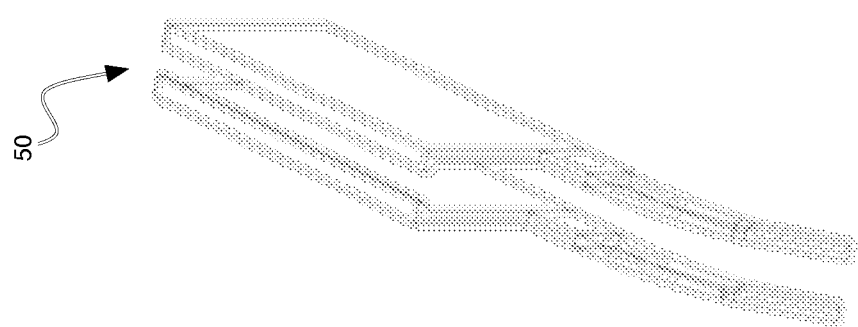
Figure 5A:
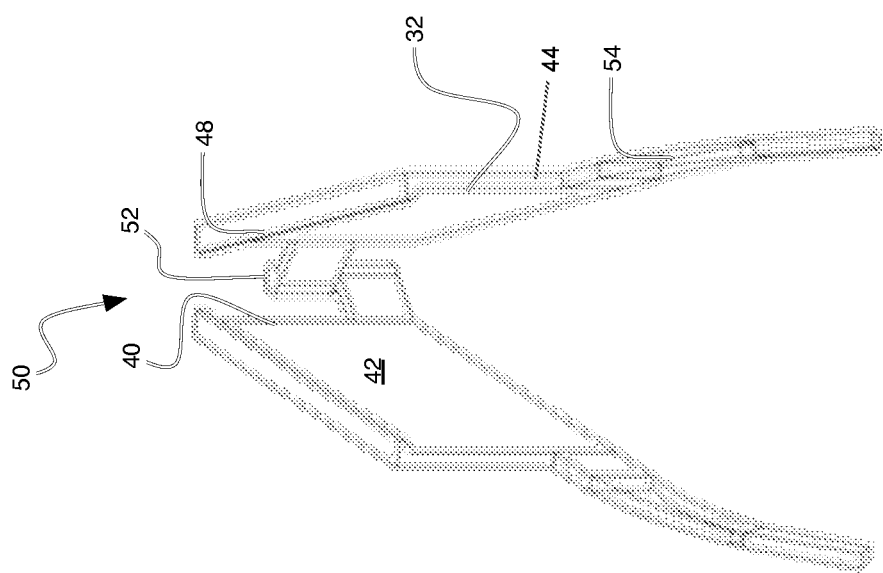

FIG. 5, comprising views 5A and 5B, shows a mitter wringer, according to a second embodiment of the invention, in an open position (FIG. 5A) and in a closed or working position (FIG. 5B).

Figure 6B:
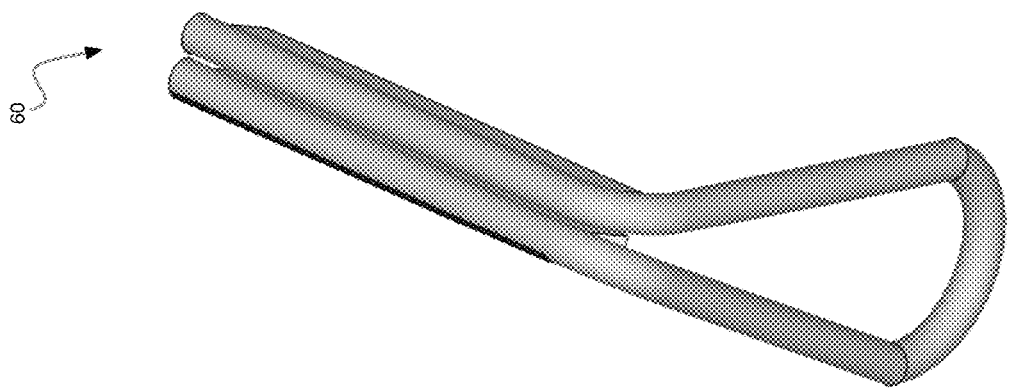
Figure 6A:
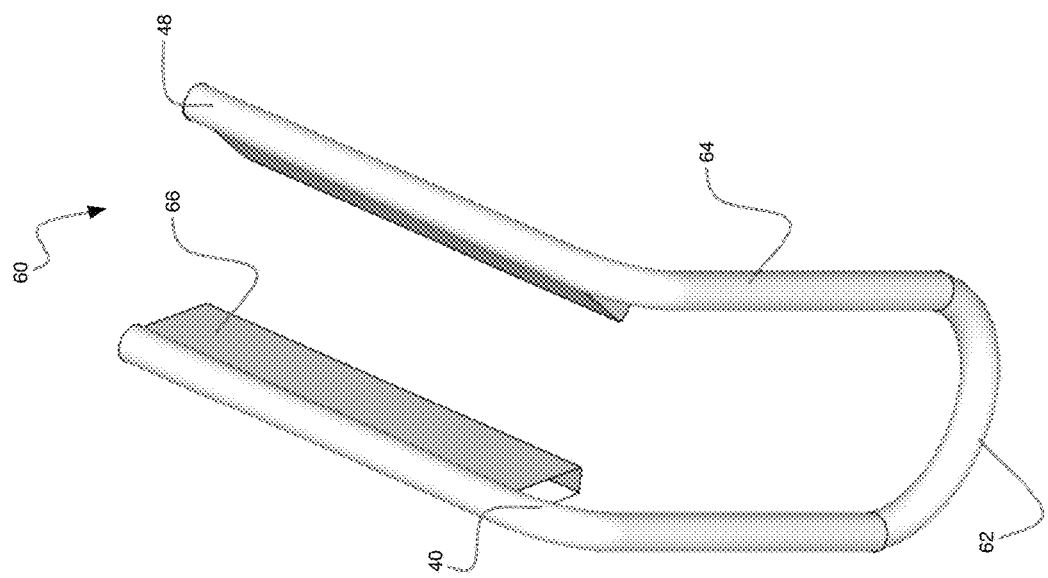

FIG. 6, comprising views 6A and 6B, shows a mitter wringer, according to a third embodiment of the invention, in an open position (FIG. 6A) and in a closed or working position (FIG. 6B).

DETAILED DESCRIPTION OF THE DRAWINGS

Referring to FIG. 3, a mitter wringer 30, according to a first embodiment of the invention, includes a pair of plates 32, a pivot 34, a first pair of handles 36, and a second pair of handles 38. The first pair of handles 36 are attached at first (proximal) ends 40 of the plates 32, proximate the pivot 34. The pivot 34 operatively connects the handles 36 for pivoting the plates 32 from a fully-opened position (FIG. 3A), in which they are displaced from each other at least sufficiently to admit a mitter between them, to a working position (FIG. 3B), in which they are closely spaced and substantially parallel to grip a mitter 16. Notably, the pivot 34 is angled with reference to the plates 32, such that in the fully-opened position the plates are spread apart along their lengths and are tilted away from each other across their widths. Having the plates 32 be tilted away from each other across their widths permits the working face 42 of each plate 32 opens to create a "V" shape with the distance between the trailing working edges 46b of each plate 32 being greater than the distance between the leading working edges 46a of each plate 32 when in the fully-opened position. Advantageously, this configuration makes it easier to grab a mitter with the wringer 30.

Each plate 32 has a working face 42 that extends from the proximal end 40 of the plate to a second (distal) end 44 of the plate that is distant from the pivot 34. The plates are arranged with their working faces mutually opposed. Each plate 32 also has working edges including a leading working edge 46a and a trailing working edge 46b, that extend from the proximal end 40 to the distal end 44. The plates 32 are connected by the pivot 34 so that each working face 42 opposes the working face of the other plate. When the plates 32 are in their working position, the opposed working faces 42 are spaced for engaging and compressing a mitter to extract or expel accumulated build-up.

The second pair of handles 38 are attached at the distal ends 44 of the plates 32. In the working position, the handles 38 are brought together so that a user can grip them in order to clamp the mitter wringer 10 in its working position. Additionally, a latch 39 may be provided on the first pair of handles 36, or on the second pair of handles 38, for holding the mitter wringer 10 in its working position.

Also, at least one plate 32 has a rail 48 that protrudes along a trailing working edge 46b, generally perpendicularly from the working face 42 toward the other plate. The trailing working edge 46b and rail 48 do not extend around the working face 42. In use, the rails 48 further indent and scrape the mitter 16 that is engaged between the plates, thereby providing a second pass for removal of build-up not expelled by the leading working edges 46a. The rails are shown as generally square-cornered and this is believed most effective for scraping, however, rounded, triangulate, or polygonal rail profiles could equally be used.

As the rails 48 are formed along the working edges 46b that are distal from the pivot 34, engagement of the working faces 42 against the mitter 16 keeps the rails separated by a minimum distance sufficient to provide scraping action without severing the mitter. Additionally, the rails 48 are dull-edged, again in order to avoid severing the mitter. Alternatively, a pivot can be provided with a limited range of motion such that the rails 48 cannot contact each other.

The mitter wringer 30, as shown, is formed of sheet metal and bar stock in order to have rigidity and durability sufficient for the purpose of scraping or expelling build-up from a tough and durable mitter. However, skilled workers will recognize that at lesser expense and weight, a similar mitter wringer could be formed of relatively hard plastic (e.g., ABS or PVC) with thickened sections in portions necessary to rigidity. It is expected that any increase in tool wear could be compensated by reduced cost for the tool. Wood also would be feasible as a material for making the invention, however, it is not anticipated that such would be mass produced.

In use, as shown in FIG. 4, the mitter wringer 30 is positioned so that the plates 32 in their open position bracket a mitter 16. The plates 32 then are closed to their working position, and the mitter wringer 30 is moved along the mitter 16 while holding the plates in their working position. Thus, when a user grips the handles 36, 38 and pulls the mitter wringer 30 along the mitter 16, a leading working edge 46a of each plate 32 indents the mitter and thereby expels the build-up from the pores of the mitter. For embodiments that have a rail 48, the mitter wringer 30 typically is moved along the mitter 16 with the rail at the trailing edge 46b of each plate 32. Thus, the leading edge 46a of the plates 32, and the rail 48, provide a sequenced indentation of the mitter for enhanced removal of build-up.

FIG. 5 shows a different mitter wringer 50, according to a second embodiment of the invention. Substantially similar features and parts are given similar numbers as in FIG. 3 and are not discussed in detail. This second mitter wringer 50 has a hinge 52 connecting the plates 32 at ends 40, with the hinge axis extending generally orthogonal to the working edges 46 of the plates, and has handles 54 extending generally along the lengths of the plates from ends 44 opposite the hinge 52. Its fabrication and use will be apparent to a skilled worker with reference to FIGS. 3 and FIG. 4 and to their corresponding descriptions above.

FIG. 6 shows another mitter wringer 60, according to a third embodiment of the invention. This third mitter wringer 60 has a live hinge 62 that joins handles 64, which connect ends 40 of rails 48. As mentioned with reference to FIG. 3, cornered rails are deemed advantageous for scraping action; however, the invention is not so limited, and the rails may be of any suitable cross-section. For example, FIG. 6 shows the rails 48 having rounded profiles, for mitigating potential abrasion of the mitters during cleansing. Wings or wipers 66 extend along the rails 48 and from the rails generally along the direction of the handles 64. Its fabrication and use will be apparent to a skilled worker with reference to the descriptions of FIGS. 3-5 above. Advantageously, among other functions, the wipers 66 serve to collect build-up squeezed from the mitter by the rails 48, thus preventing re-adhesion of the build-up onto the mitter behind the rails, or re-absorption of the build-up into the mitter ahead of the rails. Referring back to FIG. 3, the plates 32 serve a similar function.

Although the invention has been described with respect to exemplary embodiments as shown in the attached drawings, those skilled in the art will apprehend various changes in form and detail consistent with the scope of the invention as defined by the appended claims.

What is claimed is:

1. A handheld mitter wringer tool comprising:
   a pair of elongate plates, each plate having a working face extending from a first end to a second end between working edges, the plates operatively connected for movement from a fully-opened position, in which the working faces are displaced apart for receiving a mitter therebetween, to a working position, in which the working faces are closely opposed and generally parallel for slidably gripping and wringing the mitter therebetween,
   a first pair of handles, each attached at an end of a respective plate, for moving the pair of plates between the fully-opened position or the working position and for moving the pair of plates in the working position along the mitter;
   a pivot that directly connects the first pair of handles, each handle attached at a first end of the respective plate; and
   a second pair of handles attached to ends of the plates opposite the first pair of handles;
   wherein at least one of the plates includes at its working face at least one rail that protrudes from one of the working edges, and when in the working position, the plates are spaced apart such that the at least one rail does not contact the opposed working face, and
   wherein the first pair of handles extend generally orthogonal to the working edges of the plates.

2. A handheld mitter wringer tool as claimed in claim 1, wherein the pivot is angled with reference to the working edges of the plates such that in the fully-opened position the working faces are tilted apart across their widths and are spread apart along their lengths, while in the working position the first pair of handles are closely adjacent each other and the second pair of handles are closely adjacent each other.

3. A handheld mitter wringer tool comprising:
   a pair of elongate plates, each plate having a working face extending from a first end to a second end between working edges, the plates operatively connected for movement from a fully-opened position, in which the working faces are displaced apart for receiving a mitter therebetween, to a working position, in which the working faces are closely opposed and generally parallel for slidably gripping and wringing the mitter therebetween,
   wherein at least one of the plates includes at its working face at least one rail that protrudes from one of the working edges, and when in the working position, the plates are spaced apart such that the at least one rail does not contact the opposed working face, and
   wherein the at least one rail is detachable from its plate.

\* \* \* \* \*